E. Kaylor,
Rock-Drill Chuck.

N°50,138. Patented Sep. 26, 1865.

Witnesses;
J. H. Phillips
E. Harmon

Inventor;
Edward Kaylor
Per W. Bakewell
Atty.

UNITED STATES PATENT OFFICE.

EDWARD KAYLOR, OF PITTSBURG, PENNSYLVANIA.

COUPLING-SHAFT FOR BORING-TOOLS.

Specification forming part of Letters Patent No. 50,138, dated September 26, 1865.

*To all whom it may concern:*

Be it known that I, EDWARD KAYLOR, of the city of Pittsburg, in the county of Allegheny and State of Pennsylvania, have invented a new and useful Improvement in Screw-Joints for Boring-Tools; and I do hereby declare the following to be a full, clear, and exact description thereof, reference being had to the accompanying drawings, forming part of this specification, in which—

Figure 1:
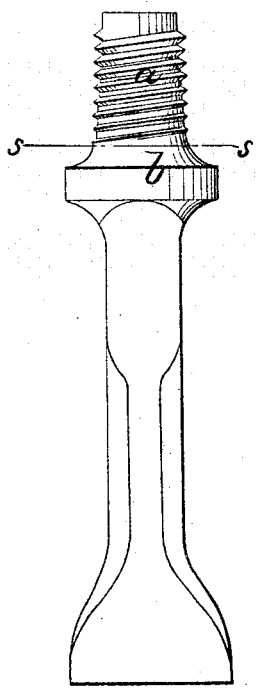
Figure 3:
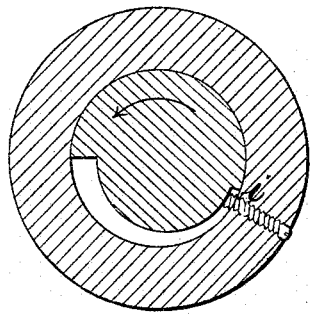
Figure 4:
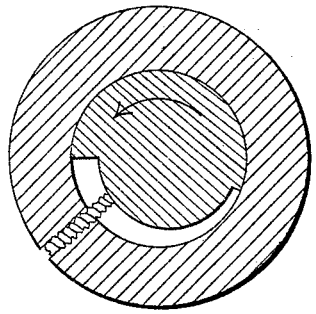
Figure 2:
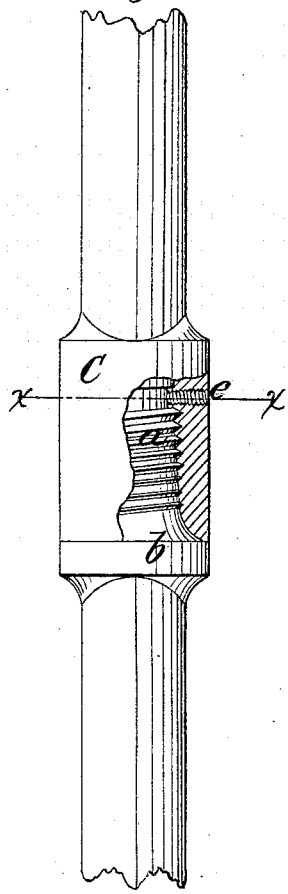

Figure 1 is a representation of a boring-bit, showing the shape and construction of the screw designed to enter the socket of the rod above it. Fig. 2 represents the ends of a boring-rod connected by my improved screw-joint, showing part of the socket removed to exhibit the operation of the set-screw for preventing the unscrewing of the joint. Figs. 3 and 4 are horizontal sections of the socket and screw at the line $x\ x$ in Fig. 2.

In the several figures like letters of reference denote similar parts.

The objects of my invention are, first, to strengthen the male screw without unduly increasing the diameter of the socket, which I effect by making the base of the screw tapering, while the outer line of the threads is parallel with its axis; and, second, to fasten the screw and socket together when screwed home by a set-screw in such a manner as that the point of bearing of the set-screw on the male screw of the joint may be gradually changed to accommodate the increasing depth to which the screw enters the socket caused by the jamming up of the parts in the operation of boring, which I accomplish by giving the set-screw a bearing on an eccentric and inclined surface on the top of the male screw.

To enable others skilled in the art to make and use my improvement, I will proceed to describe its construction and operation.

The screw-joint and the mode of fastening it are the same, whether applied to the uniting of the boring bit and rod, as in Fig. 1, or to any of the joints of the pieces composing the boring-rod shown in Fig. 3.

In the drawings, $a$ is the male screw at the upper end of each of the pieces of boring-rod. At the base of the screw is a fillet, $b$, of the same diameter as the outside of the socket $c$, into which the screw $a$ enters. The screw-threads cease a short distance above the fillet $b$, and the rod is curved outward from the point where the screw-threads cease to the edge of the fillet, so as to avoid any angle at the point where the lower end of the socket bears against the fillet $b$ or base of the screw $a$; and to increase the strength of the screw at that point where it would otherwise be liable to break from the point indicated by the line $s\ s$ in Fig. 1 to within a short distance of the top of the male screw $a$, the outer edge of the threads of the screw are of uniform diameter; but the screw threads are not chased to the same depth throughout, but are chased deeper at the upper end and gradually lessen in depth until, at the point $s\ s$ near the fillet $b$, the screw-threads disappear, the base-line of the screw rising to the periphery of the screw-thread. The effect of this is to make the base-line of the screw tapering, which materially increases its strength and renders it much less liable to break. The socket $c$ is cylindrical outside, but its cavity corresponds in shape with or is the counterpart of the screw $a$, the edge of the screw in the socket being gradually lowered from the upper end downward, and the lower part of the cavity being curved outward so as to fit on the base of the screw above the fillet $b$.

Near the top of the socket is a set-screw, $e$, which, when screwed up, is nearly flush with the exterior surface of the socket, and its point enters the cavity beyond the edge of the screw-threads in the socket. If the point of the set-screw entered a corresponding hole in the male screw $a$ when the socket was screwed down it would prevent the socket becoming unscrewed; but such a use of the set-screw is impracticable for any length of time in boring-tools, because the concussion of the boring-rods in use is so great as to break the set-screw and the continual jamming of the screw $a$ and socket $c$ staves up the end of the socket, making it shorter, so that the screw will enter more deeply into it. When the screw $a$ is thus screwed down farther into the socket the relative position of the point of the set-screw $e$ and the face of the male screw $a$ is changed, so that the notch formerly used will no longer answer the purpose. To overcome this difficulty and enable the set-screw to prevent the unscrewing of the screw $a$ and socket $c$ at any point at which it is likely to come in contact with the face of the screw $a$, I cut down the top of the screw $a$ for the distance of about half its perimeter in the line of the top thread of the screw, as shown in Figs. 1 and 2, the face of the part thus cut being a curve eccentric to the circumference of the screw, the cut increasing in depth with the descent of the screw-thread, thus forming a curved inclined plane. This will be seen more clearly by reference to Fig. 3, in which the arrow indicates the direction in which the screw $a$ is turned when it is screwed into the socket $c$. When the joint is new, and before it has got jammed, the set-screw $e$ will press against point of the inclined bearing-surface when the socket $c$ is screwed down on the fillet of the screw $a$, and the shoulder $i$ prevents the socket from turning in the opposite direction. When the end of the socket $c$ and fillet $b$ of the screw $a$ have become worn or staved up, so that the screw enters deeper into the socket, as in Fig. 4, the point of the set-screw presses against the bearing-surface lower down or nearer to the center of the screw, and as the inclined surface is higher back of the point of the screw it serves as a wedge to prevent the screw $a$ or socket $c$ turning in that direction, which would tend to unscrew them.

In order to separate the socket $c$ and screw $a$ it is only necessary to unscrew the set-screw $e$ very slightly, so as to withdraw its point beyond the outer circumference of the head of the screw. If during the operation of boring any of the joints loosen by the jamming of the socket, they may be tightened by screwing them tightly and then screwing the set-screw down on its bearing-surface.

I do not claim, broadly, the use of a set-screw to prevent the turning of a screw-and-socket joint; but What I do claim as my invention, and desire to secure by Letters Patent, is—

1. So constructing the male screw for the joint of boring-tools as that the body of the screw at the base of the threads shall be tapering from the fillet upward, while the diameter of the screw at the circumference of the threads shall be cylindrical, for the purpose of strengthening the screw at its base, substantially as hereinbefore described.

2. The inclined eccentric bearing on the face of the male screw, in combination with the socket and its set-screw, constructed substantially as and for the purpose hereinbefore set forth.

In testimony whereof I, the said EDWARD KAYLOR, have hereunto set my hand.

EDWARD KAYLOR.

Witnesses:
C. W. CRAWFORD,
A. S. NICHOLSON.